(12) United States Patent  
Kato et al.

(10) Patent No.: US 8,491,822 B2  
(45) Date of Patent: Jul. 23, 2013

(54) TIN OXIDE PARTICLES AND PROCESS FOR PRODUCING THE SAME

(75) Inventors: Kazuhiko Kato, Saitama (JP); Akihiro Modeki, Saitama (JP); Kenji Suzuoka, Saitama (JP); Yasunori Tabira, Saitama (JP); Isamu Yashima, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 86 days.

(21) Appl. No.: 13/377,602

(22) PCT Filed: Jul. 20, 2010

(86) PCT No.: PCT/JP2010/062162  
§ 371 (c)(1),  
(2), (4) Date: Dec. 12, 2011

(87) PCT Pub. No.: WO2011/010631  
PCT Pub. Date: Jan. 27, 2011

(65) Prior Publication Data  
US 2012/0085979 A1    Apr. 12, 2012

(30) Foreign Application Priority Data

Jul. 21, 2009   (JP) .................................. 2009-169712  
Oct. 26, 2009   (JP) .................................. 2009-245735

(51) Int. Cl.  
*H01B 1/08*    (2006.01)  
*C01G 19/02*   (2006.01)

(52) U.S. Cl.  
USPC ....................................... 252/520.1; 423/618

(58) Field of Classification Search  
USPC ............................ 252/518.1, 520.1; 423/618  
See application file for complete search history.

(56) References Cited

U.S. PATENT DOCUMENTS 6,200,674 B1 * 3/2001 Kumar et al. ................. 428/332  
6,787,231 B1 * 9/2004 Furman et al. ............... 428/402

FOREIGN PATENT DOCUMENTS

| JP | 60065724 | 4/1985 |
| JP | 3054114 | 3/1991 |
| JP | 10294103 | 11/1998 |
| JP | 2000195505 | 7/2000 |
| JP | 2004359477 | 12/2004 |
| JP | 2008150258 | 7/2008 |
| JP | 2008222540 | 9/2008 |

OTHER PUBLICATIONS

International Search Report, PCT/JP2010/062162 dated Nov. 2, 2010.  
J.D. Donaldson, W. Moser and W.B. Simpson, The Structure of the Red Modification of Tin (II) Oxide, Acta Crystallographica, vol. 16, p. 22, 1963.

* cited by examiner

*Primary Examiner* — Mark Kopec  
(74) *Attorney, Agent, or Firm* — Young & Thompson

(57) ABSTRACT

A tin oxide particle having at least two diffraction peaks at 2θ (deg) of 9±1° and 28±1° in XRD measurement by Cu/Kα radiation. The tin oxide particle preferably shows diffraction peaks at 2θ (deg) of 19±1°, 48±1°, and 59±1°. The tin oxide particle preferably has electroconductivity. The tin oxide particle is preferably produced by mixing an aqueous solution containing tin (II) and a hydroxyl-containing organic compound in a heated condition with an alkali.

20 Claims, 3 Drawing Sheets

TIN OXIDE PARTICLES AND PROCESS FOR PRODUCING THE SAME

TECHNICAL FIELD

This invention relates to a novel tin oxide particle and a process for producing the same.

BACKGROUND ART

It is known that a non-electroconductive material, such as plastics, may be made electroconductive by the addition of an electrically conductive powder. Examples of known electroconductive powders include metal powders, carbon black, and tin oxide doped with antimony or a like dopant. Addition of metal powder or carbon black to plastics makes the plastics black, which can limit the utility of the plastics. Addition of tin oxide doped with antimony, etc. makes plastics bluish black, which can limit the utility of the plastics as with the case of adding carbon black. In addition, using antimony involves the problem of environmental burdens. Hence, various studies have been reported on tin oxide free from a dopant, such as antimony.

Patent literature 1 (see below) describes alkali-stabilized tin oxide sol having a particle size of 30 nm or smaller and containing tetramethylammonium hydroxide in an NH3 to SnO$_2$ molar ratio of 0.01 to 0.3. The tin oxide sol is obtained by adding tetramethylammonium hydroxide to an alkaline tin oxide sol having a tin oxide concentration of 15 wt % or less in terms of SnO$_2$, followed by concentration.

Patent literature 2 teaches an alternative process for preparing tin oxide sol comprising adding tin to 0.1 to 8 N hydrochloric acid in an HCl to Sn molar ratio of 0.5 to 1 and then adding thereto a hydrogen peroxide solution. According to the disclosure, the resulting tin oxide particles have an average particle size of 5 to 100 nm.

Patent literature 3 proposes particles, which are not tin oxide particles but a precursor for producing tin oxide particles, having a flaky shape and containing 60 to 88 wt % of Sn and 1 to 15 wt % of organic matter in terms of carbon. The precursor particles disclosed show a sharp peak at about 9° in XRD. According to the disclosure, this peak is attributed to the flaky shape of the particles.

However, the tin oxide particles produced by the above described techniques are not regarded as being sufficient in electroconductivity and transparency when formed into film.

Apart from the above techniques, tin (II) oxide having an orthorhombic crystal structure with lattice constants of a=0.5 nm, b=0.572 nm, and c=0.1112 nm is reported in non-patent literature 1 (see below). A report on the space group of this tin oxide is also found in the same literature. Based on these data, the inventors of the present invention calculated the X-ray diffraction peak of the tin oxide and found that the peak is at about 28°. It was also found that the tin oxide shows a peak ascribed to the internal structure at about 60° or greater. According to the literature, however, the tin oxide is unstable and ready to change to another structure. The literature is silent on the electroconductivity or transparency of the tin oxide.

CITATION LIST

Patent Literature
 Patent literature 1: JP 2004-359477A
 Patent literature 2: JP 2008-222540A
 Patent literature 3: JP 2008-150258A
Non Patent Literature
 Non Patent literature 1: Acta Crystallographica, vol. 16, p. 22, 1963

SUMMARY OF INVENTION

Technical Problem

An object of the invention is to provide tin oxide particles free from the drawbacks of the above described conventional techniques and a process for producing such tin oxide particles.

Solution to Problem

The invention provides a tin oxide particle having at least two diffraction peaks at 2θ (deg) of 9±1° and 28±1° in XRD measurement by Cu/Kα radiation.

The invention also provides a suitable process for producing the tin oxide particle. The process includes mixing an aqueous solution containing tin (II) and an organic compound having a hydroxyl group with an alkali and heating.

The invention also provides another suitable process for producing the tin oxide particle. The process includes mixing an alkali into an aqueous solution containing tin (II) in a heated condition in such an amount as to produce a molar quantity of OH$^-$ 0.1 to 1.6 times the molar quantity of the tin (II).

Advantageous Effects of Invention

The invention provides tin oxide particles excellent in transparency and electroconductivity when formed into film.

DESCRIPTION OF EMBODIMENTS

Figure 1:
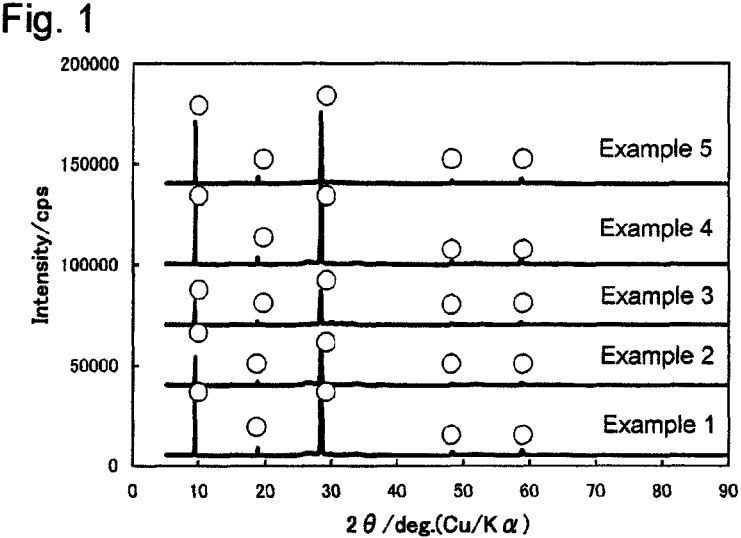
FIG. 1 shows XRD patterns of the tin oxide particles obtained in Examples 1 to 5.

The present invention will be described based on its preferred embodiments. The tin oxide particle of the invention is electroconductive and has a structure characterized by at least two main diffraction peaks at 2θ (deg) of 9±1° and 28±1° in XRD measurement by Cu/Kα radiation. All the types of tin oxide hitherto known, including SnO$_2$ and SnO, do not show diffraction peaks either of the two angles mentioned above. In other words, tin oxide particles having diffraction peaks at these angles are unknown. The tin oxide particle of the invention is completely novel.

The increased electroconductivity of conventionally known electroconductive tin oxide is generally obtained by doping tetravalent tin with a dopant element, such as antimony, niobium, or tantalum. In contrast, the increased electroconductivity of the tin oxide according to the invention owes to control of the crystal structure of tin oxide. The technique of the invention allows for increasing the electroconductivity of tin oxide particles while overcoming the drawbacks of using a dopant element, such as economical disadvantage and large environmental burden. Tin oxide having only divalent tin is, while electroconductive, black-colored and therefore unable to be used in applications requiring transparency, such as a transparent electroconductive film. Tin oxide having only tetravalent tin is unable to have increased electroconductivity over that of tin oxide having only divalent tin. In contrast, the tin oxide particles of the invention have a whitish color, which allows use as a transparent electroconductive film, and exhibits high electroconductivity, which makes it feasible to provide the transparent electroconductive film with increased electroconductivity.

The tin oxide particle of the invention further shows diffraction peaks at 2θ (deg) of 19±1°, 48±1°, and 59±1° in addition to the two peaks mentioned above. The peaks at 9±1° and 28±1° are the main peaks with higher intensity than others. The present inventors presume that the tin oxide of the invention has such a layered crystal structure that shows spatial fluctuations triggered by a long period structure and the like existing in a crystal plane. Based on this presumption, given that the peak at 2θ=9±1° is assigned to the reflection on the (001) plane, the peak at 19±1° is assigned to the reflection on the (002) plane, the peak at 28±1° is assigned to the reflection on the (003) plane, the peak at 48±1° is assigned to the reflection on the (005) plane, and the peak at 59±°1 is assigned to the reflection on the (006) plane. It is concluded that all these peaks are attributed to systematic reflection, namely first to sixth order systematic reflection. The peak attributed to the reflection on the (004) plane is too weak compared with the other peaks to be observed in practice.

The spacing of crystal lattice planes of the tin oxide particle of the invention corresponding to the first order systematic reflection was found to be 0.94 to 0.95 nm with a standard deviation less than $1\times10^{-4}$ nm. This strongly implies that the tin oxide particle of the invention has the above stated layered crystal structure.

The tin oxide particle of the invention is also characterized in that the peaks at 9±1° and 28±1° are very sharp. Sharpness of a peak reflects the level of crystallinity. That is, the tin oxide particle of the invention has high crystallinity. Regarding to the systematic reflection as referred to above, the tin oxide particle of the invention does not show reflection of higher order than sixth order in XRD despite of its high crystallinity. This remarkable result of observation is another characteristic of the tin oxide particle of the invention.

The tin oxide particle of the invention is also characterized by its thermal behavior in a reducing atmosphere. More specifically, when the tin oxide particle is heated in a nitrogen atmosphere containing 1% to 4% hydrogen at 400° C. for 2 hours, it comes to exhibit the peak of metallic Sn that is not observed before the heating in XRD. In some cases, peaks of $SnO_2$ and SnO are observed after the heating. In contrast, $SnO_2$ or SnO does not show change of peaks in XRD even when heated under the same conditions. Thus, on being heated in a reducing atmosphere, the tin oxide particle of the invention displays such unique properties that part of tin is reduced to metallic tin and that $SnO_2$ and SnO increase in crystallinity, resulting in coexistence of zero-valent Sn, divalent Sn, and tetravalent Sn.

XRD is carried out using a powder X-ray diffractometer RINT-TTRIII from Rigaku Corp. Powder prepared in the manner, e.g., of Example 1 is put in a dedicated glass-made holder and analyzed by XRD under the following conditions:
Measuring range: 2θ (deg/CuKα)=from 5° to 90°
Tube voltage: 50 kV
Tube current: 300 mA
Angle increment: 0.02°
Scanning rate: 4°/min.

It is preferred for the tin oxide particle of the invention to contain only tin as a metal element and only oxygen (in some cases oxygen and hydrogen) as other elements and to be substantially free from a dopant element, namely, of non-doped type. For tin oxide particles to be non-doped is advantageous in that highly electroconductive tin oxide particles are obtained without using various dopant elements that are expensive and economically noncompetitive or impose great environmental burdens. Examples of dopant elements include those conventionally used in the art, such as Nb, Ta, Sb, W, P, Ni, and Bi. By the term "substantially free from" as used herein is meant that intentional addition of a dopant element is excluded. Unavoidable incorporation of a trace amount of a dopant element during the production process of the tin oxide particles is therefore allowable.

As stated, the tin oxide particle of the invention is preferably free from a dopant element. Nevertheless, a dopant element may be present in some specific applications. In the cases where the tin oxide particle contains a dopant element, the content of the dopant element is preferably 0.01 to 20 mol %, more preferably 0.05 to 15 mol %, relative to the total tin from the viewpoint of enhancing the electroconductivity without impairing cost economy. The dopant elements that may be used in such cases include one or more of the above recited elements.

The tin oxide particles of the invention preferably have an average primary particle size of 1 to 5000 nm, more preferably 3 to 3000 nm, even more preferably 3 to 1000 nm, as observed using a scanning electron microscope (SEM).

The tin oxide particles of the invention are also characterized by high electroconductivity, which is specifically represented by such low resistance as a powder volume resistivity of $10^5$ Ω-cm or less, preferably $10^4$ Ω-cm or less, more preferably $10^3$ Ω-cm or less, under a 500 kgf load. The method of measuring powder volume resistivity will be described later.

The tin oxide particles of the invention exhibit high transparency when formed into film. For example, a film having a thickness of 2 to 3 μm and containing the tin oxide particles in an amount of 30% to 80% exhibits very high transparency as having a total transmission of 85% or more, preferably 90% or more. The method for film formation will be described in detail in Examples hereinafter given.

A preferred process for producing the tin oxide particles of the invention will then be described. In the process, divalent tin (tin (II)) is used as a starting material. The divalent tin is dissolved in water together with an organic compound having a hydroxyl group to make a mixed aqueous solution, and the mixed aqueous solution is, while being in a heated condition, mixed with an alkali. Each step is described below in detail.

A water soluble compound of tin (II) is provided as a starting material. Such a water soluble compound is exemplified by tin (II) chloride. The tin (II) ion concentration in the mixed aqueous solution may range from 0.01 to 3 mol/L, preferably 0.05 to 1.5 mol/L. Although using a tin (IV) compound as a starting material is conceivable, the inventors' investigations have revealed that tin (II) is readier to provide a desired oxide than tin (IV). Accordingly, tin (II) is used as a starting material in the process of the invention.

Separately from the tin (II) compound, an organic compound having a hydroxyl group is provided. Such an organic compound may be a low molecular compound or a high molecular compound. Examples of a low molecular, hydroxyl-containing organic compound include monohydric alcohols that may be aliphatic, alicyclic, or aromatic. Examples of aliphatic monohydric alcohols include monohydric alcohols having 1 to 6 carbon atoms, such as methanol, ethanol, n-butanol, and n-hexanol. Examples of alicyclic monohydric alcohols are cyclohexanol and terpineol. Examples of aromatic monohydric alcohols include benzyl alcohol.

The high molecular, hydroxyl-containing organic compound is exemplified by polyvinyl alcohols and polyols. The polyvinyl alcohols may be unmodified polyvinyl alcohol per se or modified polyvinyl alcohols. The polyvinyl alcohol may be either completely saponified or partially saponified (degree of saponification=80% to 90%). Examples of modified polyvinyl alcohols include carboxyl-modified, alkyl-modified, acetoacetyl-modified, acrylic acid-modified, methacrylic acid-modified, pyrrolidone-modified, vinylidene-modified, and silanol-modified polyvinyl alcohols. It is preferred to use a polyvinyl alcohol (—CH(OH)CH2—)n having an average degree of polymerization (n) of 200 to 30000, more preferably 500 to 10000. The degree of polymerization can be measured by size exclusion chromatography (SEC). Examples of the polyols include ethylene glycol, diethylene glycol, triethylene glycol, polyethylene glycol, polypropylene glycol, propanediol, butanediol, pentanediol, hexanediol, glycerol, hexanetriol, butanetriol, and 3-methylpentane-1,3,5-triol. Cellosolves, such as methoxyethanol, ethoxyethanol, propoxyethanol, and buthoxyethanol; and carbitols, such as methoxymethoxyethanol, ethoxyethoxyethanol, propoxyethoxyethanol, and butoxyethoxyethanol, are also useful.

In using a monohydric alcohol as the organic compound, the concentration of the hydroxyl-containing organic compound in the mixed aqueous solution preferably ranges from 0.005% to 30%, more preferably from 0.01% to 10%, by weight. Within that range, the effects of the hydroxyl-containing organic compound are fully achieved; inconveniences such as thickening hardly occur; and desired tin oxide particles having a uniform particle size are successfully obtained. For the same reasons, in using a high molecular hydroxyl-containing organic compound, the concentration of the organic compound is preferably 0.005% to 10%, more preferably 0.01 to 5%, by weight.

The ratio of tin (II) to hydroxyl-containing organic compound in the mixed aqueous solution in terms of Sn to OH molar ratio is preferably 0.01 to 150, more preferably 0.03 to 75. Within that range, unreacted Sn ions are less likely to remain in the solution, and $SnO_2$ or tin (II) hydroxide [$Sn_3O_2(OH)_2$], which are by-products, hardly precipitate.

A mixed aqueous solution containing tin (II) and the hydroxyl-containing organic compound is thus prepared. The mixed aqueous solution is then heated. The heating temperature is preferably 50° to 105° C., more preferably 70° to 100° C. Within that temperature range, desired tin oxide particles are obtained without need to use a pressure-resistant apparatus, such as an autoclave, while preventing unintentional production of SnO or $SnO_2$.

To the mixed aqueous solution in a condition heated to a temperature within the range recited above is added an alkali (basic substance). Tin (II) is neutralized by this operation. Examples of the alkali include alkali metal hydroxides, such as sodium hydroxide and potassium hydroxide; alkaline earth metal hydroxides, such as magnesium hydroxide; carbonates, such as $NaHCO_3$ and $NH_4HCO_3$; and ammonia. The pH of the aqueous alkali solution to be added is preferably such that the mixed aqueous solution after the alkali addition may have a pH of 2 to 9, more preferably 2.5 to 7. When the pH of the mixed aqueous solution is in the range recited, desired tin oxide particles are obtained in a single phase.

It is preferred that the addition of the aqueous alkali solution to the mixed aqueous solution of tin (II) oxide and the hydroxyl-containing organic compound be slow, taking a predetermined time. When the aqueous alkali solution is added all at once, care should be taken because such way of addition may fail to produce desired tin oxide particles. When the aqueous alkali solution is added slowly, it is recommended to adjust the rate of addition so that the pH of the mixed aqueous solution may be kept within the range recited above.

Desired tin oxide particles thus form in the liquid. There can be tin oxyhydroxide as a by-product in the liquid. It is therefore desirable to add hydrogen peroxide to the liquid for the purpose of removing the by-product. Addition of hydrogen peroxide accelerates oxidation of tin oxyhydroxide to produce tin dioxide. Because tin dioxide is produced in the form of fine particles, it can be separated by water elutriation making use of the difference in settling velocity of particles. In water elutriation, the desired tin oxide particles are sediment, while $SnO_2$ to be removed is in the supernatant. Because $SnO_2$ is dispersible under an alkaline condition, classification efficiency by water elutriation may be increased by adjusting the pH of the liquid to 8 to less than 11 with, e.g., $NH_4OH$ and then highly dispersing $SnO_2$ by the use of a high-speed agitator or by ultrasonic irradiation prior to the water elutriation. To control the oxidation of the tin oxyhydroxide, hydrogen peroxide is preferably added in the form of a diluted aqueous solution having a predetermined concentration. From this viewpoint, the diluted hydrogen peroxide solution preferably has a concentration of about 1% to 15% by weight.

The thus collected tin oxide particles may easily be freed of impurities by, for example, repulping with water. To sufficiently remove impurities, repulping with water is preferably performed until the electroconductivity of the dispersing medium (water) reduced to 2000 μS or less, more preferably 1000 μS or less.

A dispersion of the tin oxide particles having been purified by repulping until the dispersing medium has a prescribed reduced electroconductivity is then subjected to a disagglomeration operation to provide tin oxide sol. The disagglomeration operation may be implemented by the use of, for example, a media mill, e.g., a bead mill. It is preferred to carry out the disagglomeration operation in the presence of a pH adjustor of various kinds so that tin oxide particles close to monodisperse may be obtained. A pH adjustor may be added after the disagglomeration. A pH adjustor capable of adjusting the pH of the dispersion to 3 to 10, preferably 3 to 6, is preferably used. Examples of such a pH adjustor include acids, such as inorganic acids (e.g., hydrochloric acid, sulfuric acid, and nitric acid) and carboxylic acids (e.g., acetic acid and propionic acid), and alkalis, such as aqueous ammonia and organic amines (e.g., ethanolamine).

As a result of the disagglomeration operation, tin oxide sol having water as a dispersing medium is obtained. The tin oxide sol thus obtained is a transparent dispersion having high storage stability. The tin oxide sol preferably contains the tin oxide particle in a concentration of 0.1% to 50%, more preferably 1% to 40%, by weight. In the tin oxide sol the tin oxide particles are highly dispersed.

The above described process, in which tin oxide is produced in a liquid phase (water), easily produces tin oxide sol with high dispersibility and low agglomeration as compared with the conventional processes in which tin oxide obtained by firing is pulverized and then slurried into sol.

The tin oxide particles of the invention may be dispersed in an organic solvent to prepare a transparent monodisperse dispersion. The dispersing may be carried out using, for example, a bead mill or a paint shaker. Useful organic solvents include polyhydric alcohols, monohydric alcohols, cellosolves, carbitols, ketones, and mixtures thereof. The concentration of the tin oxide particles in the transparent dispersion is preferably 0.1% to 50%, more preferably 1% to 40%, by weight. The transparent dispersion has high storage stability. The transparent dispersion may serve as, for example, an ink material by addition of a binder.

Examples of the polyhydric alcohols are ethylene glycol, diethylene glycol, triethylene glycol, polyethylene glycol, polypropylene glycol, propanediol, butanediol, pentanediol, hexanediol, glycerol, hexanetriol, butanetriol, 3-methyl-pentane-1,3,5-triol, and glycerol. Examples of the monohydric alcohols are methanol, ethanol, propanol, pentanol, hexanol, octanol, nonanol, decanol, terpineol, benzyl alcohol, and cyclohexanol. Examples of the cellosolves are methoxyethanol, ethoxyethanol, propoxyethanol, and butoxyethanol. Examples of the carbitols include methoxyethoxyethanol, ethoxyethoxyethanol, propoxyethoxyethanol, and butoxyethoxyethanol. Examples of the ketones include acetone, methyl ethyl ketone, diethyl ketone, methyl isobutyl ketone, and diacetone alcohol.

Figure 6:
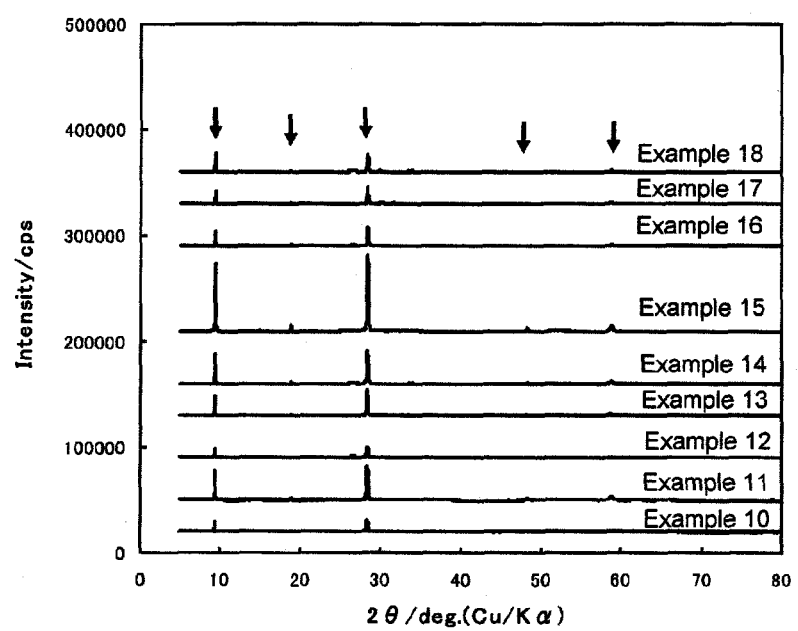
FIG. 6 shows XRD patterns of the tin oxide particles obtained in Examples 10 to 18.

To further increase the electroconductivity of the tin oxide particles of the invention, it has been turned out effective to thermally treat the tin oxide particles obtained through the above described process. The heat treatment is conducted in an oxygen-containing atmosphere, such as the atmosphere. The heat treatment is preferably carried out at 60° to 350° C., more preferably 120° to 300° C., for 0.5 to 24 hours, more preferably 1 to 10 hours. The heat treatment causes no change in the crystal structure of the tin oxide particle, as will be demonstrated by comparing the XRD results of Example 1 (FIG. 1) and those of Example 18 (FIG. 6).

The above described process employs a hydroxyl-containing organic compound in the synthesis of the tin oxide as desired. Alternatively, the hydroxyl-containing organic compound may not be used. In this alternative process, an alkali (base) is mixed into an aqueous solution containing tin (II) in a heated condition preferably in such an amount as to produce a molar quantity of $OH^-$ 0.1 to 1.6 times, more preferably 0.3 to 1.4 times, the molar quantity of the tin (II). The aqueous solution containing tin (II) that can be used in this process may be the same as used in the aforementioned process. This also applies to the alkali.

In the alternative process, the aqueous solution containing tin (II), which does not contain a hydroxyl-containing organic compound, is heated preferably to 50° to 105° C., more preferably 70° to 100° C. An alkali is added to the aqueous solution in a condition heated to a temperature in that range. By this operation, divalent tin is neutralized. In the present process, the amount of the alkali to be added for tin (II) neutralization is significant. That is, it is necessary to add the above-specified amount of the alkali. This amount of concern is smaller than the alkali that is used in the aforementioned process in which a hydroxyl-containing organic compound is used in combination. If the alkali (base) is added in an amount that produces a quantity of OH— exceeding 1.6 times the molar quantity of tin (II), an inconvenience results, in which black plate-shaped coarse SnO particles are produced.

Similarly to the process using the hydroxyl-containing organic compound in combination, addition of the aqueous alkali solution to the tin (II) aqueous solution is preferably conducted slowly over a prescribed period of time. In this case, it is preferred to maintain the pH of the aqueous tin (II) solution at 2 to 9, more preferably 2.5 to 7.

Thus, tin oxide particles as desired are produced in the liquid. The resulting liquid is treated in the same manner as in the process using the hydroxyl-containing organic compound.

The tin oxide particles thus obtained are useful in broad applications with their high electroconductivity being taken advantage of. The applications include charging rollers, photoreceptor drums, toners, electrostatic brushes, and the like of printers or copiers; flat panel displays, CRTs, Braun tubes, and the like; coatings, inks, emulsions, and the like. With the layered crystal structure being taken advantage of, the tin oxide particles are also useful as a raw material of a positive electrode active material or as a negative electrode active material of lithium secondary batteries or a gas fixing material. In using the tin oxide particles as a raw material of a positive electrode active material, the tin oxide particles are mixed with a lithium-containing compound (e.g., lithium nitrate), and the mixture is fired in the atmosphere to yield a lithium-tin double oxide, which can be used as a positive electrode active material.

EXAMPLES

The invention will now be illustrated in greater detail with reference to Examples, but it should be understood that the invention is not construed as being limited thereto. Unless otherwise noted, all the percents are by weight.

Example 1

In 418 g of pure water was dissolved 4.51 g of sodium hydroxide to prepare an aqueous alkali solution for neutralization. Separately, 0.5 g of polyvinyl alcohol (hereinafter abbreviated as PVA) partially saponified and having an average degree of polymerization n=1500 to 1800 was put in a 200 ml beaker previously containing 100 g pure water and dissolved by heating to 60° C. to prepare an aqueous PVA solution. Separately, 14.97 g of tin dichloride dihydrate was dissolved in 383 g of pure water in a beaker to prepare an aqueous tin solution. The whole amount of the aqueous PVA solution was added to the aqueous tin solution, and the system was thoroughly mixed up to obtain a mother liquor.

The mother liquor was heated to 90° C. while stirring with a paddle stirrer, and the whole amount of the above prepared aqueous alkali solution was fed thereto over 90 minutes using a tube pump (feed rate: about 5 ml/min). During the alkali addition, the mother liquor had a pH of 3 to 4. After completion of the addition, the system was aged for 5 minutes. Then, a solution of 7.5 g of 30% hydrogen peroxide in 30 g of pure water was added to the mother liquor at a rate of 5 ml/min, followed by aging for 5 minutes to give desired tin oxide sol. The pH of the sol was between 2 and 3.

The sol was filtered through filter paper (Advantec 5C). The filter cake was washed by pouring 1 L pure water. The resulting cake was repulped in pure water, filtered, and washed by pouring water again. These operations were repeated three times. The thus washed cake was dried in the atmosphere in a hot air drier set at 120° C. for 10 hours, and the solid was disagglomerated in an agate mortar and classified using an SUS mesh having an opening size of 75 µm. The results of elementary analysis of the resulting powder are shown in Table 1. The elementary analysis was carried out by using ICP (SPS-3000, from SII NanoTechnology Inc.) for tin, silicon, and iron, a gas analyzer (EMGA-620, from Horiba, Ltd.) for oxygen, and a gas analyzer (EMIA-920V, from Horiba, Ltd.) for carbon. Absorption spectrometry (turbidimetry using silver nitrate) was used for chlorine (cf. Applied Inorganic Colorimetry Editorial Committee, Muki Oyo Hishoku Bunseki-2, Kyoritsu Publ.).

TABLE 1

| | Sn | Si | Fe | O | C | Cl |
|---|---|---|---|---|---|---|
| | | | | | | unit/weight % |
| Example 1 | 77.8 | 0.01 | 0.006 | 17 | 0.74 | 3.28 |

The powder was subjected to XRD according to the procedure described above. The crystal lattice spacing, powder resistivity, and a total transmission of a film were determined by the methods described below. The results obtained are shown in FIG. 1 and Table 2.

(1) Crystal Lattice Spacing

Interpreting the above described five peaks observed from $2\theta = 9°$ to $59°$ as being attributed to the (001), (002), (003), (005), and (006) planes in sequence, the lattice spacing was determined by the least square method.

(2) Powder Resistivity

The tin oxide particles were compressed under a pressure of 500 kgf to make a sample. The resistivity of the sample was measured by the four-prove resistance method using Lorest PAPD-41 from Mitsubishi Chemical Corp.

(3) Total Transmission of Film

The tin oxide particles weighing 7.4 g and 6.4 g of a commercially available acrylic resin were added to 10 g of a toluene/butanol (=7:3 by weight) mixed solvent and dispersed therein with beads in a paint shaker. The resulting dispersion was applied to a PET film and air dried for 1 hour to form a transparent film, the thickness of which was found to be 2 μm as observed using an electron microscope. The total transmission of the film was determined using a transmission measuring instrument NDH-1001DP from Nippon Denshoku Industries Co., Ltd.

Figure 2:
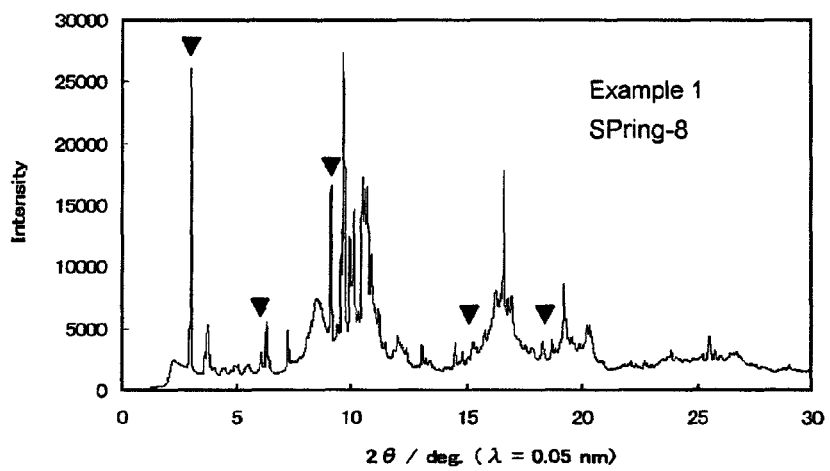
FIG. 2 sows an X-ray diffraction pattern of the tin oxide particles of Example 1 obtained by using synchrotron radiation of SPring-8, a largest scale radiant light facility.

In order to examine the internal crystal structure of the tin oxide powder obtained in Example 1, the tin oxide was subjected to X-ray diffractometry by using synchrotron radiation at Spring-8, a largest scale radiant light facility in Japan Synchrotron Radiation Research Institute. The wavelength of the X-rays used in the measurement was 0.0501326 nm. The sample to be analyzed was packed in a glass capillary tube loosely so as not to be oriented in a certain direction. X-Ray diffraction lines were recorded using a Debye-Scherrer camera and converted to intensity vs. $2\theta$. The results obtained are shown in FIG. 2, in which the peaks indicated by downward pointing triangles correspond to the peaks indicated by circles in FIG. 1.

Example 2

Tin oxide particles were obtained in the same manner as in Example 1, except for using 0.5 g of ethanol in place of PVA. The resulting tin oxide particles were analyzed in the same manner as in Example 1. The results obtained are shown in FIG. 1 and Table 2.

Example 3

Tin oxide particles were obtained in the same manner as in Example 1, except for using 0.5 g of n-butanol in place of PVA. The resulting tin oxide particles were analyzed in the same manner as in Example 1. The results obtained are shown in Table 2.

Example 4

Tin oxide particles were obtained in the same manner as in Example 1, except for using 0.5 g of hexanol in place of PVA. The resulting tin oxide particles were analyzed in the same manner as in Example 1. The results obtained are shown in FIG. 1 and Table 2.

Example 5

Tin oxide particles were obtained in the same manner as in Example 1, except for using 0.5 g of benzyl alcohol in place of PVA. The resulting tin oxide particles were analyzed in the same manner as in Example 1. The results obtained are shown in FIG. 1 and Table 2.

Comparative Example 1

Figure 3:
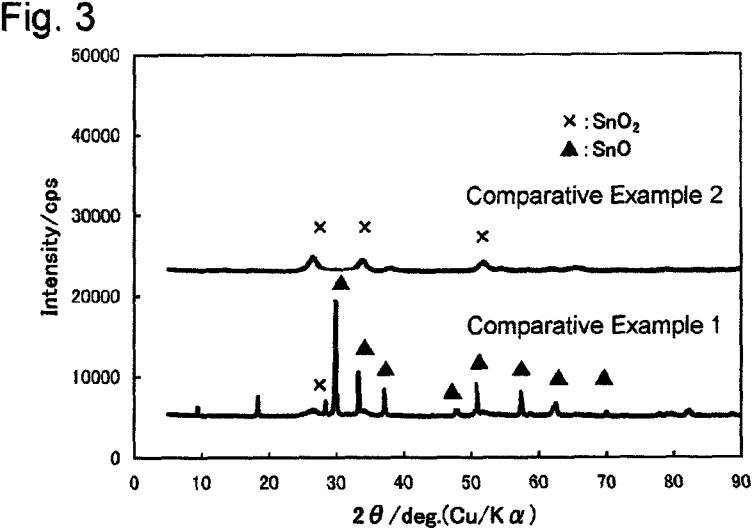
FIG. 3 displays an XRD pattern of the tin oxide particles obtained in Comparative Examples.

Tin oxide particles were obtained in the same manner as in Example 1, except that PVA was not used. The resulting tin oxide particles were analyzed in the same manner as in Example 1. The results obtained are shown in FIG. 3 and Table 2.

Comparative Example 2

Tin oxide particles were obtained in the same manner as in Example 1, except that the mother liquor was not heated, i.e., the reaction was conducted at room temperature (25° C.). The resulting tin oxide particles were analyzed in the same manner as in Example 1. The results obtained are shown in FIG. 3 and Table 2. The tin oxide particles were also subjected to elementary analysis in the same manner as previously described. The results are shown in Table 3.

TABLE 2

| | Additive | Reaction Temp (° C.) | Lattice Spacing (nm) | Powder Resistivity ($\Omega \cdot$ cm) | Total Transmission of Film (%) |
|---|---|---|---|---|---|
| Example 1 | PVA | 90 | 0.943 | $2 \times 10^2$ | 93 |
| Example 2 | ethanol | 90 | 0.946 | $4 \times 10^2$ | 90 |
| Example 3 | n-butanol | 90 | 0.945 | $4 \times 10^2$ | 91 |
| Example 4 | n-hexanol | 90 | 0.943 | $3 \times 10^2$ | 90 |
| Example 5 | benzyl alcohol | 90 | 0.944 | $3 \times 10^2$ | 92 |
| Comp. Example 1 | none | 90 | — | $1 \times 10^3$ | 75 |
| Comp. Example 2 | PVA | 25 | — | $7 \times 10^4$ | 91 |

TABLE 3

| | Sn | Si | Fe | O | C | Cl |
|---|---|---|---|---|---|---|
| | | | | | | unit/weight % |
| Comparative Example 2 | 72.1 | 0.017 | 0.007 | 25 | 1.05 | 0.92 |

As is apparent from the results shown in FIG. 1, all of the tin oxide particles obtained in Examples 1 through 5 show five peaks at the same positions. In contrast, the tin oxide particles obtained in Comparative Examples show only the diffraction peaks of $SnO_2$ (Comparative Example 2) or the diffraction peaks of $SnO_2$ and other diffraction peaks (Comparative Example 1) as depicted in FIG. 3. As is apparent from the results in Table 2, it is also proved that the tin oxide particles obtained in each Example exhibit higher electroconductivity than those of Comparative Examples. The tin oxide particles of each Example are also proved to provide a film with high transparency as compared with a film of each Comparative Example.

Comparing between FIGS. 1 and 2 shows that the peaks observed in the XRD shown in FIG. 1 are also observed in FIG. 2. Furthermore, FIG. 2 demonstrates peaks other than those observed in the XRD shown in FIG. 1, which suggests that the tin oxide crystal obtained in Example 1 has an internal structure.

Example 6

Example 6 is to verify the usefulness of the tin oxide particles of the invention as a negative electrode active material of a lithium secondary battery.

Figure 4:
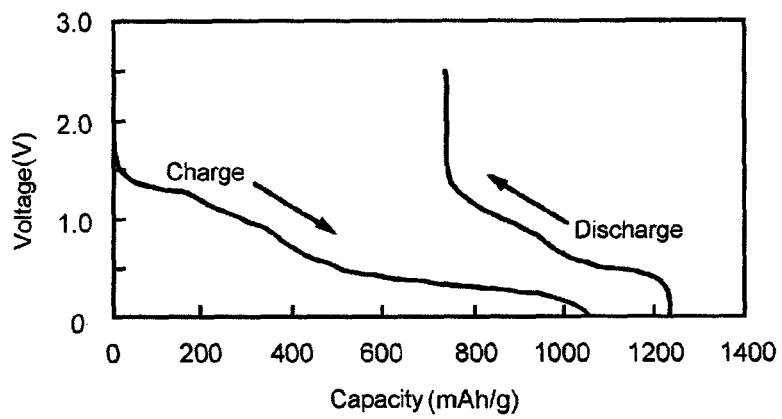
FIG. 4 depicts a graph showing charge/discharge curves of a lithium secondary battery having the tin oxide particles of Example 1 as a negative electrode active material.

The tin oxide particles of Example 1 weighing 2.85 g, 0.15 g of acetylene black, and 0.33 g of polyvinylidene fluoride were mixed, and 3 g of N-methyl-2-pyrrolidinone was added thereto, followed by mixing in a defoaming mixer (from Thinky Corp.) to prepare a slurry. The slurry was applied to a side of 18 μm-thick copper foil and dried at 120° C. The coated copper foil was cut to a width of 6 cm, and a pressure of 2 ton was applied thereto using a roll press. A 14 mm diameter circle was stamped out from the foil, followed by drying in vacuo at 120° C. overnight to make a negative electrode. The amount of the tin oxide particles (active material) of the negative electrode was 6 mg/cm$^2$. A size 2032 coin cell was assembled in an argon atmosphere in a glove box using the resulting negative electrode, Li foil as a counter electrode, and, as an electrolyte, a 1 mol/L solution of $LiPF_6$ in a 1:1 (by volume) mixed solvent of ethylene carbonate and diethyl carbonate. The resulting coin cell was subjected to charge/discharge testing under the following conditions. The cell was charged at a fixed current rate (0.175 mA/cm$^2$) up to a voltage of 0.0 V (vs. Li$^+$/Li) and then at a constant voltage of 0.0 V until the current density reduced to 0.035 mA/cm$^2$. The cell was discharged at a constant current rate (0.175 mA/cm$^2$) to a voltage of 2.5 V (vs. Li$^+$/Li). The results are shown in FIG. 4. The results in FIG. 4 prove that the tin oxide particles of the invention have a charge/discharge capacity and are useful as a negative electrode active material of a lithium secondary battery.

Example 7

Example 7 is to verify the usefulness of the tin oxide particles of the invention as a raw material of a positive electrode active material of a lithium secondary battery.

Figure 5:
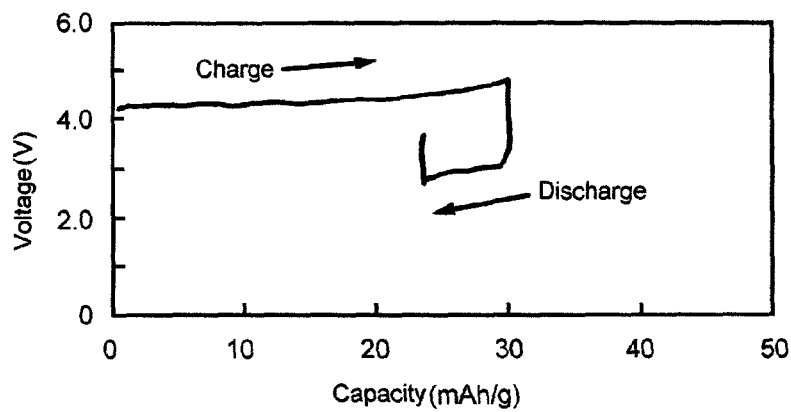
FIG. 5 depicts a graph showing charge/discharge curves of a lithium secondary battery having a positive electrode active material prepared by mixing the tin oxide particles of Example 1 and lithium nitrate and firing the mixture at 400° C. in the atmosphere.

The tin oxide particles obtained in Example 1 weighing 6.00 g and $LiNO_3$ weighing 2.61 g were thoroughly mixed in a mortar. The mixture was packed into an aluminum boat and fired in the atmosphere at 400° C. for 5 hours to prepare a positive electrode active material comprising a lithium-tin double oxide. The positive electrode active material weighing 2.85 g, 0.15 g of acetylene black, and 0.33 g of polyvinylidene fluoride were mixed, and 3 g of N-methyl-2-pyrrolidinone was added thereto, followed by mixing in a defoaming mixer (from Thinky Corp.) to prepare a slurry. The slurry was applied to a side of 18 μm-thick aluminum foil and dried at 120° C. The aluminum foil was cut to a width of 6 cm, and a pressure of 2 ton was applied to the cut foil using a roll press. A 14 mm diameter circle was stamped out from the foil, followed by drying in vacuo at 120° C. overnight to make a positive electrode. The amount of the active material of the positive electrode was 6 mg/cm$^2$. A size 2032 coin cell was assembled in an argon atmosphere in a glove box using the resulting positive electrode, Li foil as a counter electrode, and, as an electrolyte, a 1 mol/L solution of $LiPF_6$ in a 1:1 (by volume) mixed solvent of ethylene carbonate and diethyl carbonate. The resulting coin cell was subjected to charge/discharge testing under the following conditions. The cell was charged at a fixed current rate (0.175 mA/cm$^2$) up to a voltage of 4.8 V (vs. Li$^+$/Li) and then at a constant voltage of 4.8 V until the current density reduced to 0.035 mA/cm$^2$. The cell was discharged at a constant current rate (0.175 mA/cm$^2$) to a voltage of 2.7 V (vs. Li$^+$/Li). The results are shown in FIG. 5. The results in FIG. 5 prove that the tin oxide particles of the invention have a charge/discharge capacity and are useful as a positive electrode active material of a lithium secondary battery.

Example 8

A transparent dispersion was prepared using the tin oxide particles of the invention and an organic solvent as a dispersing medium as follows:

In a 50 ml-volume hermetic container made of polypropylene were put 1.57 g of the tin oxide particles obtained in Example 1, 18 g of ethylene glycol, and 140 g of 0.1 mm diameter zirconia beads and shaken using a paint shaker for 3 hours to disagglomerate the particles. After the disagglomeration operation, the beads were separated by filtration under reduced pressure to give a beige transparent dispersion. The dispersion retained the highly disperse state without settling the particles even after kept at ambient temperature for one month. A glassy solid remained on drying the dispersion at 200° C., and the residual solids content was found to be 8 wt %.

Example 9

A transparent dispersion was prepared using the tin oxide particles of the invention and water as a dispersing medium as follows:

In a 50 ml volume polypropylene hermetic container were put 1.39 g of the tin oxide particles obtained in Example 1, 16 g of water, and 140 g of 0.1 mm diameter zirconia beads and shaken using a paint shaker for 3 hours to disagglomerate the particles. After the disagglomeration operation, the beads were separated by filtration under reduced pressure. The resulting dispersion had a pH of 5.4. The dispersion was adjusted to pH 3.0 by addition of a small amount of acetic acid to give a beige transparent dispersion. The dispersion retained the highly disperse state without settling the particles even after kept at ambient temperature for one month. A glassy solid remained on drying the dispersion at 200° C., and the residual solids content was found to be 7 wt %.

Example 10

Tin oxide particles were obtained in the same manner as in Example 1, except for using 12.58 g of anhydrous tin (II) chloride in place of 14.97 g of tin (II) chloride dihydrate. The resulting tin oxide particles were analyzed by XRD in the same manner as in Example 1. The results are shown in FIG. 6.

Example 11

Tin oxide particles were obtained in the same manner as in Example 10, except for increasing the amount of the PVA to 5.0 g. The resulting tin oxide particles were analyzed by XRD in the same manner as in Example 1. The results are shown in FIG. 6.

Example 12

Tin oxide particles were obtained in the same manner as in Example 11, except for using partially saponified polyvinyl alcohol having an average degree of polymerization n of 500 as PVA. The resulting tin oxide particles were analyzed by XRD in the same manner as in Example 1. The results are shown in FIG. 6.

Example 13

Tin oxide particles were obtained in the same manner as in Example 11, except for using completely saponified polyvinyl alcohol having an average degree of polymerization n of 400 to 600 as PVA. The resulting tin oxide particles were analyzed by XRD in the same manner as in Example 1. The results are shown in FIG. 6.

Example 14

Tin oxide particles were obtained in the same manner as in Example 11, except for using of completely saponified polyvinyl alcohol having an average degree of polymerization n of 900 to 1100 as PVA. The resulting tin oxide particles were analyzed by XRD in the same manner as in Example 1. The results are shown in FIG. 6.

Example 15

Tin oxide particles were obtained in the same manner as in Example 10, except for using no PVA and reducing the amount of sodium hydroxide to 2.65 g. The resulting tin oxide particles were analyzed by XRD in the same manner as in Example 1. The results are shown in FIG. 6.

Example 16

Tantalum-doped tin oxide particles were obtained in the same manner as in Example 13, except for replacing the aqueous tin solution with a mixed aqueous solution containing tin and tantalum that was prepared by dissolving 12.57 g of anhydrous tin (II) chloride and 0.016 g of tantalum pentachloride. The resulting particles were dried in the atmosphere at 120° C. for 10 hours and classified using an SUS mesh having an opening size of 75 μm. The resulting powder was subjected to XRD in the same manner as in Example 1. Additionally, the crystal lattice spacing, powder resistivity, and a total transmission of a film were determined in the same manner as in Example 1. The results obtained are shown in FIG. 6 and Table 4.

Example 17

The powder obtained in Example 16 was fired in the atmosphere at 300° C. for 2 hours in an electric oven. The fired powder was subjected to XRD in the same manner as in Example 1. Additionally, the crystal lattice spacing, powder resistivity, and a total transmission of a film were determined in the same manner as in Example 1. The results obtained are shown in FIG. 6 and Table 4.

Example 18

Example 18 was carried out for comparison with Example 17. The powder obtained in Example 1 was fired in the atmosphere at 300° C. for 2 hours in an electric oven. The fired powder was subjected to XRD in the same manner as in Example 1. Additionally, the crystal lattice spacing, powder resistivity, and a total transmission of a film were determined in the same manner as in Example 1. The results obtained are shown in FIG. 6 and Table 4.

TABLE 4

| Example | Additive | Dopant Element | Reaction Temp. (° C.) | Heat Treatment | Lattice Spacing (nm) | Powder Resistivity (Ωcm) | Total Transmission of Film (%) |
|---|---|---|---|---|---|---|---|
| 16 | PVA | Ta | 90 | none | 0.946 | $2 \times 10^2$ | 91 |
| 17 | PVA | Ta | 90 | 300° C. × 2 hrs | 0.948 | $2 \times 10^0$ | 85 |
| 18 | PVA | nil | 90 | 300° C. × 2 hrs | 0.946 | $7 \times 10^2$ | 87 |

By comparing the powder resistivity of Example 18 shown in Table 4 with that of Example 1 shown in Table 2, it is seen that the tin oxide of Example 18, which was obtained by heat treating the tin oxide of Example 1 at high temperature, exhibits higher electroconductivity. By comparing the powder resistivity between Examples 16 and 17 shown in Table 4, it is seen that the improvement in electroconductivity by the high temperature treatment is further enhanced by doping with tantalum.

The invention claimed is:

1. A tin oxide particle having at least two diffraction peaks at 2θ (deg) of 9±1° and 28±1° in XRD measurement by Cu/Kα radiation.

2. The tin oxide particle according to claim 1, which has electroconductivity.

3. The tin oxide particle according to claim 2, further having diffraction peaks at 2θ (deg) of 19±1°, 48±1°, and 59±1°.

4. The tin oxide particle according to claim 2, wherein the diffraction peaks are attributed to systematic reflection on specific crystal planes of the tin oxide, and the spacing of crystal lattice planes corresponding to the first order systematic reflection is 0.94 to 0.95 nm.

5. The tin oxide particle according to claim 2, being substantially free from a dopant element.

6. The tin oxide particle according to claim 2, which is for use as a negative electrode active material or a raw material of a positive electrode active material for lithium secondary batteries.

7. The tin oxide particle according to claim 1, further having diffraction peaks at 2θ (deg) of 19±1°, 48±1°, and 59±1°.

8. The tin oxide particle according to claim 7, wherein the diffraction peaks are attributed to systematic reflection on specific crystal planes of the tin oxide, and the spacing of crystal lattice planes corresponding to the first order systematic reflection is 0.94 to 0.95 nm.

9. The tin oxide particle according to claim 7, being substantially free from a dopant element.

10. The tin oxide particle according to claim 7, which is for use as a negative electrode active material or a raw material of a positive electrode active material for lithium secondary batteries.

11. The tin oxide particle according to claim 1, wherein the diffraction peaks are attributed to systematic reflection on specific crystal planes of the tin oxide, and the spacing of crystal lattice planes corresponding to the first order systematic reflection is 0.94 to 0.95 nm.

12. The tin oxide particle according to claim 11, being substantially free from a dopant element.

13. The tin oxide particle according to claim 11, which is for use as a negative electrode active material or a raw material of a positive electrode active material for lithium secondary batteries.

14. The tin oxide particle according to claim 1, being substantially free from a dopant element.

15. The tin oxide particle according to claim 1, which is for use as a negative electrode active material or a raw material of a positive electrode active material for lithium secondary batteries.

16. A process for producing the tin oxide particle according to claim 1, comprising mixing an aqueous solution containing tin (II) and an organic compound having a hydroxyl group in a heated condition with an alkali.

17. The process according to claim 16, wherein the organic compound having a hydroxyl group is a polyvinyl alcohol, a polyol, or a monohydric lower alcohol.

18. The process according to claim 16, further comprising adding hydrogen peroxide to the mixture after mixing the alkali.

19. A process for producing the tin oxide particle according to claim 1, comprising mixing an alkali into an aqueous solution containing tin (II) in a heated condition in such an amount as to produce a molar quantity of $OH^-$ 0.1 to 1.6 times the molar quantity of the tin (II).

20. A transparent dispersion comprising water or an organic solvent, and the tin oxide particle according to claim 1 dispersed in water or the organic solvent.

* * * * *